(12) United States Patent
Xu-Rabl et al.

(10) Patent No.: US 10,683,442 B2
(45) Date of Patent: Jun. 16, 2020

(54) SELF-SUPPORTING ADHESIVE BODY FOR STRUCTURAL BONDS

(71) Applicant: SIKA TECHNOLOGY AG, Baar (CH)

(72) Inventors: Rui Xu-Rabl, Zürich (CH); Matthias Gössi, Uster (CH); Jürgen Finter, Freiburg (DE)

(73) Assignee: SIKA TECHNOLOGY AG, Baar (CH)

( * ) Notice: Subject to any disclaimer, the term of this patent is extended or adjusted under 35 U.S.C. 154(b) by 56 days.

(21) Appl. No.: 15/781,590

(22) PCT Filed: Dec. 16, 2016

(86) PCT No.: PCT/EP2016/081393
§ 371 (c)(1),
(2) Date: Jun. 5, 2018

(87) PCT Pub. No.: WO2017/103080
PCT Pub. Date: Jun. 22, 2017

(65) Prior Publication Data
US 2018/0371299 A1    Dec. 27, 2018

(30) Foreign Application Priority Data
Dec. 17, 2015  (EP) .................................. 15200944

(51) Int. Cl.
| C09J 171/02 | (2006.01) |
| C09J 163/00 | (2006.01) |
| C09J 109/02 | (2006.01) |
| C08L 71/00 | (2006.01) |
| C08L 63/00 | (2006.01) |
| C08G 65/336 | (2006.01) |
| C08L 71/02 | (2006.01) |
| C08L 25/12 | (2006.01) |
| C08F 36/06 | (2006.01) |
| C08F 36/08 | (2006.01) |
| C09J 11/06 | (2006.01) |

(52) U.S. Cl.
CPC ............ *C09J 171/02* (2013.01); *C08F 36/06* (2013.01); *C08F 36/08* (2013.01); *C08G 65/336* (2013.01); *C08L 25/12* (2013.01); *C08L 63/00* (2013.01); *C08L 71/00* (2013.01); *C08L 71/02* (2013.01); *C09J 11/06* (2013.01); *C09J 109/02* (2013.01); *C09J 163/00* (2013.01)

(58) Field of Classification Search
CPC ...................................................... C09J 171/02
See application file for complete search history.

(56) References Cited

U.S. PATENT DOCUMENTS

| 6,322,890 B1 | 11/2001 | Barron et al. |
| 2013/0186562 A1* | 7/2013 | Finter ................ C08G 59/4246 156/293 |
| 2015/0017435 A1* | 1/2015 | Xu-Rabl .................. C08J 3/243 428/354 |

FOREIGN PATENT DOCUMENTS

| EP | 2 182 025 A1 | 5/2010 |
| EP | 2 368 956 A1 | 9/2011 |
| EP | 2 570 450 A1 | 3/2013 |

OTHER PUBLICATIONS

May 28, 2019 Office Action issued in European Patent Application No. 16 819 862.0.
Jan. 25, 2017 International Search Report issued in International Patent Application No. PCT/EP2016/081393.
IUPAC Compendium of Chemical Terminology, 2nd Edition; 1997.
Jun. 19, 2018 International Preliminary Report on Patentability issued in International Patent Application No. PCT/EP2016/081393.

* cited by examiner

*Primary Examiner* — Daniel H Lee
(74) *Attorney, Agent, or Firm* — Oliff PLC

(57) ABSTRACT

A composition having at least one structural adhesive and at least one chemically crosslinked elastomer based on the silane-functional, non-polar polymer, said elastomer being provided in the form of a penetrating polymer network in the structural adhesive. Self-supporting adhesive bodies, particularly in the form of adhesive tapes, can be produced from such compositions and can be used for structural bonds and to reinforce metal structures.

15 Claims, No Drawings

SELF-SUPPORTING ADHESIVE BODY FOR STRUCTURAL BONDS

TECHNICAL FIELD

The invention is situated within the field of adhesive bodies, more particularly in the form of adhesive tapes, which in particular have a dimensional stability such that they require no support film. The invention relates, furthermore, to a method for producing such adhesive bodies, which are formed from a corresponding composition, and to a method for joining substrates, in which the adhesive body is mounted between the substrates and is cured preferably with heating.

PRIOR ART

Structural adhesives, especially those based on epoxide, have been known for a long time in the prior art and are sold for example under the trade name "SikaPower®" by Sika Schweiz AG. These structural adhesives are in general pastelike and are applied from cartridges. A problem which occurs in the application of liquid or liquefied adhesives, however, is that the applied adhesive may smear and comes consequently into contact with regions of the substrate with which contact is not intended.

Alternatively, the aforementioned structural adhesives may also be processed into adhesive tapes, although in that case they must be applied to a carrier material (in the form of a strong fabric, for example).

In the manual application of the adhesives, reproducible application over large distances requires a relatively large degree of experience in order to prevent smearing or unwanted contacting of the bond site. In view of the low viscosity of many conventional structural adhesives, furthermore, it is necessary that they be modified with a relatively large fraction of thixotropic agents, so that they do not run off from the substrate at elevated temperature before gelling.

An advantage of the aforementioned adhesive tapes is that they can be applied by hand. In that case, however, the adhesive applied to the carrier is subject to the same requirements in terms of sag resistance as the conventional structural adhesives. This means that here as well it is necessary to add thixotropic agents. The need to modify the structural adhesives with thixotropic agents results in the disadvantage of an adverse effect on the properties of the adhesive, especially if the fraction of these agents required is high because of the inherent viscosity of the structural adhesive at the application temperature.

In addition to conventional adhesive tapes, recent years have seen descriptions of certain adhesives which have shape memory properties. Thus, for example, EP 2 570 450 A1 describes shape memory materials based on thermosetting structural adhesives and chemically crosslinked, silane-functional elastomers. The chemically crosslinked elastomers used in EP 2 570 450 A1 are, in particular, silane-modified polyethylene or polypropylene glycols. A disadvantage of these polyglycols, however, is that they are also soluble in the cured adhesive and adversely affect its mechanical properties.

Against this background there is a demand for structural adhesives which on the one hand exhibit on sufficiently high viscosity even at elevated temperatures, so that the adhesive does not flow off or drip off from the substrate. For this purpose, the adhesives ought as far as possible to require only small amounts of thixotropic agents or none at all, that adversely affect the adhesive properties of the pure adhesive.

Adhesives of this kind could be processed into self-supporting adhesive bodies, more particularly in the form of adhesive tapes, and would in that way avoid the use of supporting substrates and associated problems of compatibility. The present patent application addresses this demand.

DESCRIPTION OF THE INVENTION

It is the object of the present invention, therefore, to specify a composition suitable for producing a self-supporting adhesive body that can be used for structural bonding, more particularly in the form of adhesive tapes, said composition overcoming the disadvantages of the prior art and in particular being producible without the use of thixotropic agents. The adhesive body is to have properties comparable with those of structural adhesives for application via cartridges.

Surprisingly it has been found that this object can be achieved with compositions as claimed in claim 1. It has been found more particularly that with the specified compositions it is possible to produce self-supporting adhesive bodies, more particularly in the form of adhesive tapes, which actually have improved properties in comparison to structural adhesives without addition of a chemically crosslinked elastomer, particularly in relation to properties such as the impact peel strength and the lap shear strength. Further aspects of the invention are subjects of further independent claims. Particularly preferred embodiments of the invention are subjects of the dependent claims.

CERTAIN EMBODIMENTS OF THE INVENTION

The present invention relates, in a first aspect, to a composition comprising at least one structural adhesive, and at least one chemically crosslinked elastomer based on a silane-functional apolar polymer. The chemically crosslinked elastomer here is present preferably in the form of an interpenetrating polymer network in the structural adhesive.

A "structural adhesive" is a curable composition comprising crosslinkable organic compounds that, on curing, develops a high adhesive force (adhesion) and internal strength (cohesion) that make it suitable for the structural joining of adherend parts, in vehicle construction, for example.

Substance names beginning with "poly", such as polyol or polyisocyanate, identify substances which formally contain two or more per molecule of the functional groups that occur in their name.

The term "polymer" encompasses on the one hand a collective of chemically uniform macromolecules which nevertheless differ in terms of degree of polymerization, molar mass, and chain length, this collective having been prepared by a polymerization reaction (chain growth addition polymerization, polyaddition, polycondensation). The term on the other hand also encompasses derivatives of such a collective of macromolecules from polymerization reactions, in other words compounds which have been obtained from reactions—such as additions or substitutions, for example—of functional groups on specified macromolecules, and which may be chemically uniform or chemically disparate. The term, furthermore, also encompasses what are called prepolymers, in other words reactive oligomeric pre-adducts whose functional groups have participated in the construction of macromolecules.

The term "silane" identifies compounds which on the one hand have at least one, customarily two or three, alkoxy groups bonded to the silicon atom directly via Si—O bonds, and on the other hand have at least one organic radical bonded to the silicon atom directly via an Si—C bond. Such silanes are also known as organoalkoxysilanes to the person skilled in the art.

Correspondingly, the term "silane group" refers to the silicon-containing group bonded to the organic radical of the silane that is bonded via the Si—C bond. The silanes, or their silane groups, have the property of undergoing hydrolysis on contact with moisture. This hydrolysis produces organosilanols, i.e., organosilicon compounds containing one or more silanol groups (Si—OH groups), and, by subsequent condensation reactions, organosiloxanes, i.e., organosilicon compounds containing one or more siloxane groups (Si—O—Si groups).

The term "silane-functional" refers to compounds which have silane groups. "Silane-functional polymers", accordingly, are polymers which have at least one silane group.

"Aminosilanes", "mercaptosilanes", and "hydroxysilanes" are silanes whose organic radical has an amino group, a mercapto group or a hydroxyl group, respectively. "Primary aminosilanes" are aminosilanes which have a primary amino group, in other words an $NH_2$ group bonded to an organic radical. "Secondary aminosilanes" are aminosilanes which have a secondary amino group, in other words an NH group bonded to two organic radicals.

"Molecular weight" is understood always as the molecular weight average $M_n$ (number average), which can be determined by means of GPC using suitable standards.

while it swells, it is not dissolved in a suitable solvent. A thermoplastic elastomer, in contrast, dissolves completely in a suitable solvent.

The presence of a chemically crosslinked elastomer may be determined, for example, in a method based on ASTM D 2765.

The structural adhesive more particularly is a thermosetting structural adhesive which has a curing temperature preferably in the range from 120° C. to 220° C., more particularly 160° C. to 200° C.

Where the structural adhesive is a thermosetting structural adhesive, it is necessary when processing the composition to ensure that the composition is not heated to an extent such that the curing process begins.

Most preferably the structural adhesive is a thermosetting epoxy resin composition comprising at least one epoxy resin and at least one hardener for epoxy resins that is activated by elevated temperature. More particularly this composition is a one-component epoxy resin composition.

The epoxy resin has on average more than one epoxide group per molecule and more particularly is a liquid epoxy resin or a mixture of a liquid epoxy resin with a solid epoxy resin. The term "solid epoxy resin" is very well known to the person skilled in the epoxide art, and is used in contrast to "solid epoxy resin". The glass transition temperature $T_g$ of solid resins is above room temperature (23° C.).

Preferred liquid epoxy resins, which in particular can be used together with a solid epoxy resin, have the formula (I).

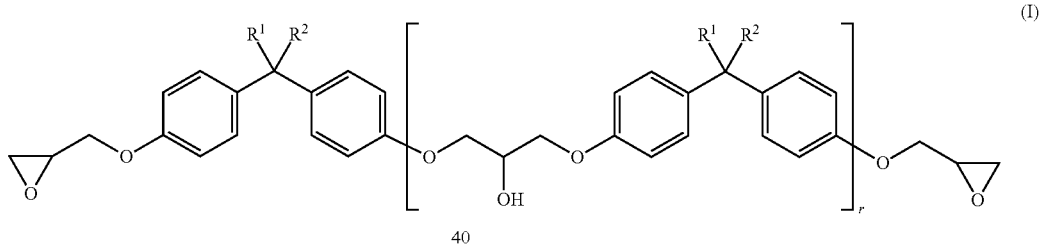

(I)

The term "interpenetrating polymer network" is used on the basis of the definition of a "semi-interpenetrating polymer network" (SIPN) according to the IUPAC Compendium of Chemical Terminology, 2nd Edition (1997). Accordingly, the SIPN comprises at least one network and also at least one linear or branched polymer, with this polymer at least partially penetrating the network. In the composition of the invention, the elastomer forms the network, while the polymer is part of the structural adhesive.

A "chemically crosslinked elastomer" is an elastomer which is crosslinked via covalent chemical bonds. In contrast to this, the crosslinking of a thermoplastic elastomer is based on physical interactions. A chemically crosslinked elastomer differs from a thermoplastic elastomer in that, In this formula, the substituents $R^1$ and $R^2$ in turn, independently of one another, are either H or $CH_3$. Furthermore, the index r has a value of 0 to 1. Preferably r has a value of ≤0.2.

Particularly preferred liquid epoxy resins are, among others, diglycidyl ethers of Bisphenol-A (DGEBA), of Bisphenol-F, and of Bisphenol-A/F. The "A/F" designation here refers to a mixture of acetone with formaldehyde, which is used as a reactant in its preparation. Examples of such liquid epoxy resins are available commercially, for example, under the trade names Araldite® GY 250, Araldite® PY 304, Araldite® GY 282 from Huntsman International LLC, or D.E.R.® 331 or D.E.R.® 330 from Dow Chemical Company, or under the trade name Epikote™ 828 or Epikote™ 862 from Momentive Specialty Chemicals BV.

Preferred solid epoxy resins have the formula (II).

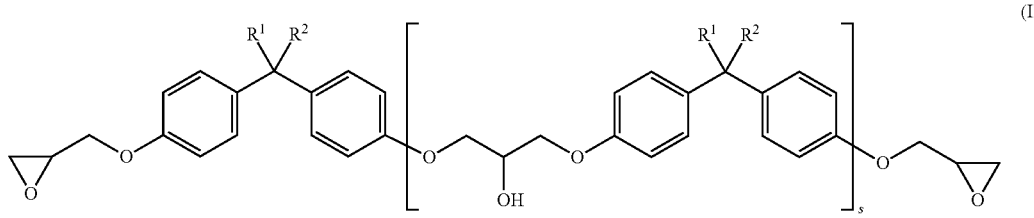

(II)

In this formula, the substituents $R^1$ and $R^2$ independently of one another are either H or $CH_3$. Furthermore, the index s has a value of ≥1, more particularly of ≥1.5, preferably of 2 to 12.

Preferred solid epoxy resins have a glass transition temperature $T_g$ in the range from 23° C. to 95° C., more particularly from 30° C. to 80° C., preferably from 35° C. to 75° C. Such solid epoxy resins are available commercially, for example, from Dow Chemical Company, from Huntsman International LLC, or from Momentive Specialty Chemicals BV.

Depending on embodiment, the epoxy resin which is used as one of the starting compounds in structural adhesive may also be a solid epoxy resin.

Further suitable epoxy resins are what are called novolacs. They have in particular the following formula (III).

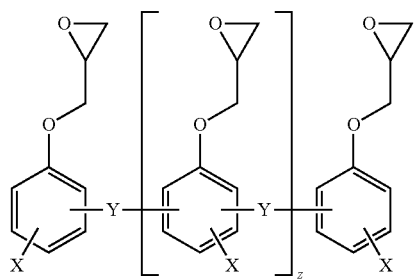

In this formula, the radical X is a hydrogen atom or a methyl group. The radical Y is —$CH_2$— or is a radical of the formula (IV).

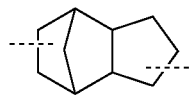

Furthermore, the index z has a value of 0 to 7, more particularly a value of ≥3.

The compounds in questions here are more particularly phenol or cresol novolacs (Y is —$CH_2$—).

Epoxy resins of these kinds are available commercially under the trade name EPN or ECN and also Tactix® 556 from Huntsman International, LLC, or within the product range D.E.N.™ from Dow Chemical Company.

The epoxy resin is preferably a liquid epoxy resin of the formula (I). In a likewise preferred embodiment, the thermosetting epoxy resin composition comprises both at least one liquid epoxy resin of the formula (I) and at least one solid epoxy resin of the formula (II).

The fraction of epoxy resin is preferably 2 to 95 wt %, more particularly 5 to 90 wt %, more preferably 10 to 70 wt %, based on the total weight of the structural adhesive.

The hardener for epoxy resins is activated by elevated temperature. The hardener for epoxy resins is preferably a compound selected from the group consisting of dicyandiamide, guanamines, guanidines, aminoguanidines, and derivatives thereof; substituted ureas, more particularly 3-(3-chloro-4-methylphenyl)-1,1-dimethylurea (chlorotoluron), or phenyldimethylureas, more particularly p-chlorophenyl-N,N-dimethylurea (monuron), 3-phenyl-1,1-dimethylurea (fenuron), 3,4-dichlorophenyl-N,N-dimethylurea (diuron), and also imidazoles and amine complexes.

A particularly preferred hardener for epoxy resins is dicyandiamide, especially in combination with a substituted urea. The advantage of combining dicyandiamide with a substituted urea lies in the resultant accelerated curing of the composition.

The fraction of the hardener for epoxy resins is preferably 0.05 to 10 wt %, more particularly 0.1 to 8 wt %, more preferably 0.2 to 6 wt %, based on the total weight of the structural adhesive.

The term "hardener" also includes catalysts and catalytically active compounds. To the person skilled in the art it is clear in this context that when using a catalyst or a catalytically active compound as a hardener for epoxy resins, the fraction of the hardener as a proportion of the overall structural adhesive is within the lower region of the specified range of values.

The epoxy resin composition may additionally comprise at least one impact modifier.

An "impact modifier" is an organic polymer added to an epoxy resin matrix that even in small quantities, i.e., at typically between 0.1 and 20 wt % in respect of the structural adhesive, produces a marked increase in the toughness and is therefore capable of accommodating relatively high impact or collision stress before the matrix tears or ruptures.

Particularly suitable as impact modifiers are reactive liquid rubbers based on nitrile rubber, or derivatives of polyether polyol polyurethanes, core-shell polymers, and similar systems known to the person skilled in the art.

Suitable impact modifiers are described as impact modifiers D in European patent application EP2182025, the content of which is hereby incorporated by reference.

The structural adhesive may comprise further constituents, of the kind customarily used in structural adhesives.

In particular, the structural adhesive may additionally comprise at least one filler. This preferably comprises mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic spheres, hollow glass spheres, hollow organic spheres, glass spheres, color pigments. "Filler" refers both to the organically coated and to the uncoated forms that are available commercially and known to the person skilled in the art. A further example are functionalized alum inoxanes, of the kind described in U.S. Pat. No. 6,322,890, for example, the content of which is hereby incorporated by reference.

The fraction of the filler, if such is included in the structural adhesive, is generally 1 to 60 wt %, more particularly 5 to 50 wt %, and very preferably 10 to 35 wt %, based on the weight of the overall structural adhesive.

The structural adhesive may, moreover, also comprise thixotropic agents, such as, for example, fumed silicas or nanoclays, impact modifiers, reactive diluents, and other constituents known to the person skilled in the art, although the addition particularly of thixotropic agents is not a necessity. Accordingly, the composition of the invention preferably contains no thixotropic agent. Most preferably the structural adhesive is a one-component thermosetting epoxy resin composition.

The fraction of the structural adhesive is preferably 50 to 85 wt %, more particularly 60 to 85 wt %, and most preferably about 65 to 80 wt %, based on the overall composition.

The composition of the invention comprises, in addition to the structural adhesive, a chemically crosslinked elastomer based on a silane-functional apolar polymer. The apolarity here refers to the backbone or to the base polymer of the silane-functional polymer prior to its functionalization with silane groups. This apolarity on the part of the silane-functional polymer is essential to the present invention, since the polymer is incompatible with the cured structural adhesive and consequently a phase separation is intended in the course of the curing of the structural adhesive. Only by this means is it possible, as self-supporting adhesive bodies, to formulate suitable systems which have sufficient mechanical strengths. The occurrence of a phase separation in a specific case can be ascertained simply by means of DMA (Dynamic Mechanical Analysis).

Ideally, prior to the curing, the silane-functional apolar polymer is in solution, and largely homogeneously distributed, in the structural adhesive. Where the structural adhesive is an epoxy resin composition, secondary hydroxyl groups are formed in the curing of the epoxy resin, and are incompatible with the apolar backbone of the silane-functional apolar polymer.

Suitability as silane-functional apolar polymers is possessed typically by silane-functional hydrocarbon polymers, typically a liquid rubber (i.e., a rubber polymer with a liquid consistency at 23° C.) which within the backbone of the base polymer, with the exception of ether functions, contains no functional groups having heteroatoms. Accordingly, polyesters are not an apolar polymer in the sense of the present invention. Suitable silane-functional apolar polymers are, for example, those based on saturated or unsaturated polymers and polyethers. In respect of polyethers, however, it should be borne in mind that the only polyethers valid as "apolar polymer" in the context of the present invention are those for which the ratio of the carbon atoms to the oxygen atoms of the monomers is on average greater than 3:1, more particularly polybutylene glycols or poly(tetramethylene) glycols or, generally, polyoxyalkylene glycols of alkylene groups of relatively high molecular mass. For the purposes of the present invention, polyethylene glycols or polypropylene glycols are considered not to be apolar, and hence silane-functional polyethylene glycols or polypropylene glycols are not considered as a silane-functional apolar polymer. Similar comments apply in respect of copolymers having polyethylene oxide and polypropylene oxide units.

Particularly suitable liquid rubbers based on unsaturated polymers are, for example, those based on polyisoprene, polybutadiene, and butadiene/acrylonitrile copolymers.

The aforementioned liquid rubbers have in particular a molecular weight in the range from 1000 to 10 000 g/mol, preferably about 1500 to 5000 g/mol, more preferably about 2000 to 5000 g/mol. The liquid rubbers preferably have an equivalent weight (i.e., a weight relativized in relation to the functional groups) in the range from about 200 to 1000 g/eq, more particularly about 300 to 1500 g/eq.

The chemically crosslinked elastomer is present preferably in the form of an interpenetrating polymer network in the structural adhesive. To this end, the chemically crosslinked elastomer based on a silane-functional apolar polymer may be introduced into the composition by mixing a silane-functional polymer with the structural adhesive and then crosslinking it in the mixture so as to form an interpenetrating polymer network in the structural adhesive.

The fraction of the chemically crosslinked elastomer based on a silane-functional apolar polymer is preferably 15 to 50 wt %, more particularly 15 to 40 wt %, and very preferably 20 to 35 wt %, based in each case on the overall composition.

Suitability as silane-functional apolar polymer is possessed in particular by reaction products of the aforesaid apolar polymers with silanes which contain silane groups of the formula $—R^4—Si(OR^1)(OR^2)(OR^3)$ or $—R^4—SiR^1(OR^2)(OR^3)$. In these formulae, the radicals $R^1$, $R^2$, and $R^3$ are alkyl groups, more particularly having 1 to 8 carbon atoms, which optionally contain oxygen atoms in the form of ether functions. The radicals $R^1$, $R^2$, and $R^3$, moreover, may be alike or different. Particularly suitable radicals $R^1$, $R^2$, and $R^3$ are methyl or ethyl groups and also $—OC_2H_4OC_2H_4OCH_3$ groups.

With particular preference the silane groups are $—R^4—Si(OEt)_3$ or $—R^4—Si(OMe)_x(OC_2H_4OC_2H_4OCH_3)_{3-x}$, where x may adopt a value of 0 to 2.

The radical $R^4$ is a linear or branched, divalent hydrocarbyl radical having 1 to 12 carbon atoms, which optionally contains cyclic and/or aromatic fractions, and optionally contains one or more heteroatoms, more particularly one or more nitrogen or oxygen atoms. $R^4$ in particular is a linear or branched alkylene group having 1 to 6 carbon atoms, preferably methylene or 2-hydroxy-1,3-propylene.

In a first embodiment, the silane-functional apolar polymer is a silane-functional polymer P1 which is obtainable through the reaction of a silane having at least one group reactive toward epoxy groups, with an apolar polymer which contains terminal epoxy groups. This reaction is carried out preferably in a stoichiometric ratio of the groups that are reactive toward epoxy groups to the epoxy groups of around 1:1 or in a slight excess of groups that are reactive toward epoxy groups, so that the resultant silane-functional polymer P1 is entirely free from epoxy groups.

Suitability as apolar polymer containing terminal epoxy groups is possessed, in the context of the embodiment elucidated here, in particular by butyl rubbers functionalized with epoxides (ETBN), of the kind obtainable, for example, under the commercial designations Hypro™ from Emerald Performance Materials.

The silane which contains at least one group that is reactive toward epoxy groups is more particularly a mercaptosilane, a hydroxysilane or an aminosilane, preferably an aminosilane.

Examples of suitable aminosilanes are primary aminosilanes such as 3-aminopropyltrimethoxysilane, 3-aminopropyldimethoxymethylsilane; secondary aminosilanes such as N-butyl-3-aminopropyltrimethoxysilane, N-phenyl-3-aminopropyltrimethoxysilane; the products of the Michael-like addition reaction of primary aminosilanes such as 3-aminopropyltrimethoxysilane or 3-aminopropyldimethoxymethylsilane with Michael acceptors such as acrylonitrile, (meth)acrylic esters, (meth)acrylamides, maleic and fumaric diesters, citraconic diesters and itaconic diesters, examples being dimethyl and diethyl N-(3-trimethoxysilylpropyl)aminosuccinate; and also analogs of the stated aminosilanes that have ethoxy, isopropoxy or methyloxyethoxyethoxy groups ($—O—C_2H_4—O—C_2H_4—OCH_3$) in place of the methoxy groups on the silicon.

In a second embodiment, the silane-functional apolar polymer is a silane-functional polymer P2 which is obtainable through the reaction of an epoxysilane with an apolar polymer containing terminal, epoxide-reactive functional groups.

Epoxysilanes suitable for such reactions are not subject to any relevant restrictions apart from the requirement that they must include an epoxy group and a silane group connected to one another via a linker. Having proven particularly suitable, since they are available commercially on favorable terms, however, are glycidoxypropylsilanes, of the kind prepared typically from glycidol and 3-chloropropylsilanes. Especially suitable glycidoxypropylsilanes are 3-glycidoxypropyltrimethoxysilane (e.g., available as Silquest® A-187 from Momentive), 3-glycidoxypropyltriethoxysilane (e.g., obtainable as Dynasylan® GLYEO from Evonik), 3-glycidoxypropylmethyldiethoxysilane (e.g., available as CoatOSil® 2287 from Momentive), or transesterification products of 3-glycidoxypropyltrimethoxysilane with diethylene glycol monomethyl ether (e.g., available as Araldite® DY 1158 from Huntsman).

As apolar polymers containing terminal, epoxide-reactive functional groups it is possible in particular to use apolar polymers having terminal hydroxyl, amino, mercapto or carboxyl functions, with the use of carboxyl functions being relatively unfavorable, in view of the high reaction temperatures needed for the reaction with epoxides, by comparison with the other variants, and hence being less preferable. It has been observed, accordingly, that excessive heating of the reaction mixture leads to a reaction of the silane groups with one another and hence to premature crosslinking (gelling) of the system. Particularly suitable, therefore, are apolar polymers having terminal amino and hydroxyl functions. Particularly suitable apolar polymers are amino-terminated butadiene/acrylonitrile copolymers (ATBN) and hydroxy-terminated butadiene/acrylonitrile copolymers (OH-HTBN). An amino-terminated butadiene/acrylonitrile copolymer is available, for example, under the trade name Hypro™ 1300X16 ATBN from Emerald Performance Materials.

Particularly suitable apolar polymers containing terminal, epoxy-reactive functional groups and being based on polyethers are amino-terminated poly(tetramethylene) glycols, an example being Jeffamine® THF-170 from Huntsman.

In a third embodiment, the silane-functional apolar polymer is a silane-functional polymer P3 which is obtainable through the reaction of a silane having at least one group reactive toward isocyanate groups, with an apolar polymer which contains terminal isocyanate groups. This reaction is carried out preferably likewise in a stoichiometric ratio of the groups that are reactive toward isocyanate groups to the isocyanate groups of about 1:1 and in a slight excess of groups that are reactive toward isocyanate groups, so that the resulting silane-functional polymer P3 is entirely free from isocyanate groups.

Suitable silanes containing at least one group that is reactive toward isocyanate groups are the same compounds mentioned above for the reaction with epoxy-terminated apolar polymers, since amino, hydroxyl and mercapto functions react both with epoxy groups and with isocyanate groups.

Especially suitable apolar polymers having isocyanate groups for preparing a silane-functional polymer P3 are apolar polymers which are obtainable through reaction of apolar polyols or polyamines, in accordance with the provisos above, with at least one polyisocyanate, more particularly a diisocyanate. These apolar polymers may be prepared by reacting the polyol and the polyisocyanate by customary processes, at temperatures for example of 50° C. to 100° C., optionally with accompanying use of suitable catalysts, with the amount of polyisocyanate being such that its isocyanate groups are present in a stoichiometric ratio of about 2:1 or more in relation to the hydroxyl groups and amine groups of the polyol and polyamine respectively. By means of these process regimes it is possible to ensure that the apolar polymer is functionalized terminally with polyisocyanates and that there is no formation of long-chain polyurethane polymers.

Polyisocyanates used may be commercial polyisocyanates, especially diisocyanates. For example, suitable diisocyanates are 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane-1,3-diisocyanate, cyclohexane-1,4-diisocyanate, 1-isocyanato-3,3,5-trimethyl-5-isocyanatomethylcyclohexane (isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-tolulene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatobiphenyl (TODD, oligomers and polymers of the aforesaid polyisocyanates, and also any desired mixtures of the aforesaid polyisocyanates.

Particularly suitable polyisocyanates are HDI, TMDI, IPDI, TDI, and also MDI, especially IPDI.

In the context of the outlined third embodiment, the apolar polymer is preferably a butyl rubber, more particularly based on polybutadiene, or a butadiene/acrylonitrile copolymer. Such rubbers may be functionalized in particular with amino groups, hydroxyl groups or mercapto groups. Alternatively, in the context of the third embodiment, the apolar polymer used may be a polyether, preferably a hydroxy-terminated polyether, and very preferably a hydroxy-terminated poly(tetramethylene) glycol. An example of a commercially available poly(tetramethylene) glycol is PolyTHF® 2000 from BASF.

In a fourth embodiment, the silane-functional apolar polymer is a silane-functional polymer P4 which is obtainable through the reaction of an isocyanatosilane with an apolar polymer containing functional end groups that are reactive toward isocyanate groups, more particularly containing hydroxyl groups, mercapto groups and/or amino groups. This reaction takes place in a stoichiometric ratio of the isocyanate groups to the functional end groups that are relative toward isocyanate groups of 1:1, or with a slight excess of the functional end groups that are reactive toward isocyanate groups, at temperatures, for example, of 20° C. to 100° C., optionally with accompanying use of catalysts.

Suitability as isocyanatosilane is possessed by compounds of the formulae (V) or (VI).

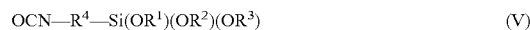

$$OCN-R^4-Si(OR^1)(OR^2)(OR^3) \qquad (V)$$

$$OCN-R^4-SiR^1(OR^2)(OR^3) \qquad (VI)$$

with $R^1$ to $R^4$ having already been described above.

Examples of suitable isocyanatosilanes of the formulae (V) or (VI) are isocyanatomethyltrimethoxysilane, isocyanatomethyldimethoxymethylsilane, 3-isocyanatopropyltrimethoxysilane, 3-isocyanatopropyldimethoxymethylsilane, and analogs thereof that have ethoxy or isopropoxy groups in place of the methoxy groups on the silicon.

The apolar polymer, as functional end groups that are reactive toward isocyanate groups, preferably contains amino groups.

Especially suitable as apolar polymers containing amino groups are the aforementioned polymers based on poly(tetramethylene) glycol, e.g., Jeffamine® THF-170 from Huntsman.

Furthermore, the silane-functional apolar polymer may be prepared by a hydrosilylation reaction of apolar polymers, and especially polyethers in accordance with the provisos above, as for example with poly(tetramethylene) glycols terminated with vinyl groups or allyl groups.

In contrast to this, it was not possible to obtain a silane-functional apolar polymer by reacting carboxy-functional apolar polymers with aminosilanes.

The composition of the invention is obtainable with particular preference by reacting a silane with an apolar polymer, where either the silane or the apolar polymer has epoxide-reactive groups, and the respective other constituent has epoxide groups; or reacting a silane with an apolymer polymer, where either the silane or the apolar polymer has isocyanate-reactive groups, and the respective other constituent has isocyanate groups;

mixing the resulting silane-functional apolar polymer with the structural adhesive; and storing the resulting composition under conditions under which the silane-functional apolar polymer crosslinks with water.

Relative to the preparation of the silane-functional apolar polymer in situ in the structural adhesive, the procedure described has the advantage that it is easier to ensure the formation of an interpenetrating polymer network.

In the course of the production of the composition of the invention, the structural adhesive is mixed with the silane-functional apolar polymer, preferably forming a homogeneous mixture. Where the structural adhesive comprises, as its epoxy resin, a solid epoxy resin, the mixing takes place at a temperature above the glass transition temperature Tg of the solid epoxy resin.

Where the structural adhesive is a thermosetting epoxy resin composition, it may be mixed with the silane-functional apolar polymer before the addition of the hardener for epoxy resins. As a result, during mixing, the temperature may be set at up to or even above the curing temperature of the thermosetting epoxy resin composition, without any curing of the structural adhesive. At higher temperatures, generally speaking, more efficient mixing is achieved.

When a mixture, more particularly a homogeneous mixture, has been obtained, the silane-functional apolar polymer is crosslinked. The elastomer formed in this process is present in particular in the form of an interpenetrating polymer network in the structural adhesive. The crosslinking of the silane-functional apolar polymer proceeds by reaction of the silane groups present with water. The water needed for crosslinking is present here in particular in the form of atmospheric moisture, which enters the composition by processes of diffusion.

For the crosslinking of the silane-functional apolar polymer with water, the composition may comprise a catalyst. Particular such catalysts are organotin compounds, examples being dibutyl tin dilaurate, dioctyl tin dilaurate, dibutyl tin diacetylacetonate, and dioctyl tin diacetylacetonate; titanates and zirconates, examples being tetraisobutoxytitanate and diisobutoxytitanium bis(ethylacetoacetate); nitrogen compounds, especially tertiary amines, examples being N,N-dimethylbenzylamine, N,N-dimethylcyclohexylamine, and 1,4-diazabicyclo[2.2.2]octane, and amidines and guanidines, examples being 1,8-diazabicyclo[5.4.0]undec-7-ene and 1,1,3,3-tetramethylguanidine; and also mixtures of the stated catalysts.

As part of the experiments conducted it emerged that the addition of an aminosilane as crosslinking assistant for the crosslinking of the silane-functional apolar polymer may contribute to an improvement in the lap shear strength and the impact peel strength. In the context of the present invention, therefore, it is preferred if an aminosilane, preferably an aminoalkyltrialkoxysilane, is added to the composition of the invention. Suitable aminosilanes are, among others, the aminosilanes stated above. One particularly suitable aminosilane is N-(2-aminoethyl)-3-aminopropyltrimethoxysilane, which is available, for example, under the trade name Silquest® A-1120 from Momentive.

The stated aminosilanes should usefully be incorporated into the composition in an amount of 0.1 to 1.5 wt %, preferably 0.2 to 1 wt %, based on the total weight of the composition.

In a further aspect, the present invention relates to a method for producing an adhesive body from a composition as described above, the method comprising the following steps:

reacting a silane with an apolar polymer, where either the silane or the apolar polymer has epoxide-reactive groups, and the respective other constituent has epoxide groups; or reacting a silane with an apolymer polymer, where either the silane or the apolar polymer has isocyanate-reactive groups, and the respective other constituent has isocyanate groups;

mixing the resulting silane-functional apolar polymer with the structural adhesive;

shaping the resulting mixture, optionally on a carrier or substrate; and storing the shaped mixture under conditions under which the silane-functional apolar polymer crosslinks with water.

In one preferred embodiment of the method, the shaping is carried out such that the adhesive body receives a sheet-like form, more particularly a tape or a strip, and hence represents an adhesive tape.

Shaping is accomplished preferably by casting.

In one preferred embodiment of the method, the silane-functional apolar polymer is crosslinked via the reaction of the silane groups with water in the form of atmospheric moisture.

A further aspect of the present invention relates to adhesive bodies produced from a composition as described above. Such adhesive bodies preferably have the form of a tape or strip and with preference have a thickness in the range from 0.1 to 5 mm, more particularly 0.5 to 3 mm. Adhesive bodies of this kind are, in particular, self-supporting, and in particular represent adhesive tapes.

The adhesive bodies produced from the method of the invention may be employed in particular for structural bonds and for reinforcing metal structures, particularly in vehicle construction.

A further aspect of the present invention, lastly, relates to a method for joining two substrates, comprising the steps of:
  applying an adhesive body as described above to a first substrate,
  contacting the adhesive body on the first substrate with a second substrate, and
  curing the composition of the adhesive body, preferably by heating.

The method for joining may optionally also be carried out with omission of the first step, in the event that the shaping of the adhesive body in accordance with the method described for producing the adhesive body has been carried out on a first substrate.

The first substrate is preferably a metal substrate, more particularly electrolytically galvanized, hot dip galvanized, and subsequently phosphated steel sheet, oiled steel sheet, and also various aluminum alloys, which may have undergone surface treatment, or is a thermoplastic substrate, as for example a polyamide, polyester, polyurethane, polyolefin, polysulfone, polyvinyl chloride, more particularly a thermoplastic substrate resistant to high temperature such as, for example, a polyamide, polybutylene) terephthalate, polyphenylene ether, polysulfone or polyether sulfone, preferably a polyamide, more particularly PA 6, PA 6,6, PA 11, PA 12, PA 6,10, PA 6,12 or a mixture thereof.

The second substrate is preferably likewise a metal substrate, more particularly electrolytically galvanized, hot dip galvanized, and subsequently phosphated steel sheet, oiled steel sheet, and also various aluminum alloys, which may have undergone surface treatment.

EXAMPLES

Set out below are exemplary embodiments which are intended to elucidate in more detail the invention described. It will be appreciated that the invention is not confined to these exemplary embodiments described.

Commercial Substances Used

| | |
|---|---|
| Hypro ™ 1300X16 ATBN | Amine-terminated butadiene-acrylonitrile copolymer; Mw = about 3600 g/mol; equivalent weight 900 g/eq, from Emerald Performance Materials |
| Jeffamine ® THF-170 | Polyetheramine based on poly(tetramethylene) glycol; Mw = about 1700 g/mol; equivalent weight 380 g/eq, from Huntsman |
| Dynasilan ® GLYEO | 3-Glycidoxypropyltriethoxysilane, from Evonik |
| Araldite ® DY 1158 | Transesterification product of 3-glycidoxypropyltrimethoxysilane with diethylene glycol monomethyl ether; Mw = about 500, from Huntsman |
| MS Polymer ™ S303H | Trimethoxysilane-terminated polypropylene glycol having an average functionality of 2.3 and an Mw of about 12 000 g/mol, from Kaneka |
| Silyl ™ SAX400 | Trimethoxysilane-terminated polypropylene glycol having an average functionality of 3 and an Mw of about 24 000 g/mol, from Kaneka |
| PolyTHF ® 2000 | Poly(tetramethylene) glycol having an Mw of about 2000 g/mol, from BASF |
| Vestanat ® IPDI | Isophorone diisocyanate, from Evonik |
| DBTDL | Dibutyl tin dilaurate, from Fluka |
| Silquest ® A-1120 | N-(2-Aminoethyl)-3-aminopropyltrimethoxysilane, from Momentive |
| Araldite ® GY 250 | Liquid epoxy resin based on DGEBA, Mw = about 375 g/mol, from Huntsman |
| Dicyandiamide | from Evonik |
| Tyzor ® IBAY | Bis(ethylacetoacetato)diisobutoxytitanium(IV), from Dorf Ketal |

Test Methods

The impact peel strength was determined on the basis of ISO 11343, the measurements being carried out at 23° C.

The lap shear strength was determined on the basis of EN1465 on a strip measuring 5×25 mm, 2 mm thick, mounted on a 0.8 mm-thickness strip of HDG steel (H380) cleaned with acetone The gel content was determined in accordance with method A of ASTM 2765. For this purpose, two containers made of a 100 mesh polyamide fabric and each containing 0.3 g of ground sample material were stored in an excess of methyl ethyl ketone (MEK) at room temperature for at least 40 hours. Thereafter the containers were washed with MEK and dried at room temperature for at least 5 hours. This was followed by further drying under reduced pressure at 50° C. for at least 18 hours. The insoluble weight fraction remaining in the container corresponds to the gel content or the gel fraction.

Production of Inventive Compositions and Adhesive Tapes obtained from them

In accordance with the quantity data in Table 1, a liquid rubber and an epoxy silane were in each case mixed in a vessel and heated to a temperature of 80° C. for 1 hour. The course of reaction was ascertained by means of the NIR absorbance of the epoxy peak at about 4522 cm$^{-1}$, it being found that the epoxy groups had substantially been consumed by reaction after a reaction time of 1 hour. After heating had taken place, the resultant silane-functional apolar polymer was admixed with the liquid epoxy resin, which was mixed in with the aid of a centrifugal mixer at 3500 rpm for 2 minutes. The hardener for epoxy resins (dicyandiamide) was then added and likewise mixed in. The completed mixtures were used to produce adhesive tapes, by being applied in a thickness of 5 mm to PTFE casting molds and also in a thickness of 0.3 mm directly to the steel substrate of the test specimens, and left to stand in air at room temperature, at 23° C., for 7 days, during which the silane groups crosslinked with moisture. The adhesive tape thus produced was tested for gel content. Additionally, the adhesive tape was cured in a forced air oven first at 80° C. for 2 hours and then at 180° C. for 1.5 hours, and was tested for lap shear strength and impact peel strength.

As comparative examples, as silane-functional polymer, two different silane-terminated polyethers based on polypropylene glycol (MS Polymer™ 5303H and Silyl™ SAX400) were used in combination with a catalyst for silane crosslinking.

The compositions of the individual formulations, and also the mechanical properties, are reported in Table 1 below.

TABLE 1

|  | Inv. ex. 1 in wt % | Inv. ex. 2 in wt % | Inv. ex. 3 in wt % | Inv. ex. 4 in wt % | Comparative ex. 1 in wt % | Comparative ex. 2 in wt % |
|---|---|---|---|---|---|---|
| Component (designation) | | | | | | |
| Liquid rubber | | | | | | |
| Hypro ™ 1300X16 ATBN | 17.8 | 14.9 | | | | |
| Jeffamine ® THF-170 | | | 13.3 | 9.9 | | |
| Epoxysilane | | | | | | |
| Dynasilan ® GLYEO | 5.8 | | 10.3 | | | |
| Araldite ® DY 1158 | | 8.7 | | 13.7 | | |
| Silane-terminated polyether | | | | | | |
| MS Polymer ™ S303H | | | | | 30.6 | |
| Silyl ™ SAX400 | | | | | | 30.6 |
| Catalyst for silane crosslinking | | | | | | |
| DBTDL | | | | | 0.3 | 0.3 |
| Silquest ® A-1120 | | | | | 1 | 1 |
| Liquid epoxy resin | | | | | | |
| Araldite ® GY 250 | 70.8 | 70.8 | 70.8 | 70.8 | 62.8 | 62.8 |
| Hardener for epoxy resins | | | | | | |
| Dicyandiamide | 5.6 | 5.6 | 5.6 | 5.6 | 5.3 | 5.3 |
| Properties | | | | | | |
| Adhesive tape | | | | | | |
| Gel content (after 7 d/RT) Cured adhesive tape | 22 | 20 | 20 | 19 | 28.5 | 30.3 |
| Tensile shear strength in MPa (after 7 d/RT & 1.5 h/180° C.) | 7.5 | 6.2 | 9.7 | 11.8 | 0.6 | 0.6 |
| Impact peel strength in N/mm (after 7 d/RT & 1.5 h/180° C.) | 6.5 | 10.5 | 1 | 2 | not measurable (too soft) | not measurable (too soft) |

In a further series of experiments, a silane-functional apolar polymer in the form of a silane-functional poly(tetramethylene) glycol ("S-PTMEG") was first produced. For this purpose, a hydroxysilane was first prepared by reaction of 3-aminopropyltriethoxysilane with L-lactide. Moreover, an isocyanate-functional poly(tetramethylene) glycol was by reaction of PolyTHF® 2000 with Vestanat® IPDI in a ratio of 1:2. The hydroxysilane was subsequently reacted at 80° C. with the isocyanate-functional poly(tetramethylene) glycol at an OH/NCO ratio of 1.1/1, to give the S-PTMEG.

The S-PTMEG was mixed subsequently by means of a centrifugal mixer with liquid epoxy resin, hardener, catalyst for silane crosslinking (Tyzor® IBAY), and optionally aminosilane (Silquest® A-1120), the further procedure being as described for example 1. The precise compositions of the materials investigated, and the physical properties ascertained, are reproduced in Table 2 below.

TABLE 2

|  | Ex. 5 in wt % | Ex. 6 in wt % | Ex. 7 in wt % | Ex. 8 in wt % |
|---|---|---|---|---|
| Component (designation) | | | | |
| Silane-functional apolar polymer | | | | |
| S-PTMEG | 17.5 | 24.5 | 17.5 | 24.5 |
| Liquid epoxy resin | | | | |
| Araldite ® GY 250 | 47.8 | 41.3 | 47.1 | 40.6 |
| Hardeners | | | | |
| Dicyandiamide | 3.7 | 3.2 | 3.6 | 3.2 |
| Tyzor ® IBAY | 1.1 | 1.1 | 1.1 | 1.1 |
| Silquest ® A-1120 | | | 0.7 | 0.7 |
| Properties | | | | |
| Adhesive tape | | | | |
| Gel content (after 7 d/RT) Cured adhesive tape | 15.9 | 23.2 | 27.3 | 35.2 |
| Tensile shear strength in MPa (after 7 d/RT & 1.5 h/180° C.) | 10.8 | 9.2 | 12.5 | 11.2 |
| Impact peel strength in N/mm (after 7 d/RT & 1.5 h/180° C.) | 0.5 | 2.9 | 1.2 | 4 |

From the results of the investigations it is evident that by adding Silquest® A-1120 it is possible to improve the lap shear strength and the peel strength further by about 20%. In the case of the examples with a relatively high fraction of liquid epoxy resin, moreover, slightly better lap shear strengths are obtained.

The invention claimed is:
1. A composition comprising
at least one structural adhesive, and
at least one chemically crosslinked elastomer based on a silane-functional apolar polymer that is a reaction prod- uct of a silane and an apolar polymer, wherein the apolar polymer is a polyether in which a ratio of carbon atoms to oxygen atoms of monomers in the polyether is on average greater than 3:1, and the silane has epoxide groups and the apolar polymer has epoxide-reactive groups, or the silane has epoxide-reactive groups and the apolar polymer has epoxide groups.

2. The composition as claimed in claim 1, wherein the chemically crosslinked elastomer is present as an interpenetrating polymer network in the structural adhesive.

3. The composition as claimed in claim 1, wherein the silane-functional apolar polymer comprises silane groups of formula —$R^4$—$Si(OR^1)(OR^2)(OR^3)$ or —$R^4$—$SiR^1(OR^2)(OR^3)$, where:

$R^1$, $R^2$, and $R^3$ are alike or different and denote alkyl groups which optionally contain at least one ether function, and $R^4$ is a linear or branched divalent hydrocarbyl radical having 1 to 12 carbon atoms and optionally one or more heteroatoms.

4. The composition as claimed in claim 1, wherein the structural adhesive is a thermosetting epoxy resin composition comprising at least one epoxy resin and at least one hardener for epoxy resins which is activated by elevated temperature.

5. The composition as claimed in claim 4, wherein the epoxy resin comprises diglycidyl ethers of Bisphenol-A.

6. The composition as claimed in claim 1, wherein a fraction of the structural adhesive is in a range of from 50 to 85 wt %, and a fraction of the chemically crosslinked elastomer based on the silane-functional apolar polymer is in a range of from 15 to 50 wt %.

7. The composition as claimed in claim 6, wherein the fraction of the structural adhesive is in a range of from 70 to 80 wt %, and the fraction of the chemically crosslinked elastomer is in a range of from 20 to 30 wt %.

8. The composition as claimed in claim 1, wherein the chemically crosslinked elastomer has been obtained using an aminosilane as a crosslinking assistant.

9. The composition as claimed in claim 1, wherein the apolar polymer is based on polybutylene glycol and/or poly(tetramethylene) glycol.

10. A method for producing an adhesive body composed of a composition as claimed in claim 1, comprising reacting the silane with the apolar polymer;

mixing the resulting silane-functional apolar polymer with the structural adhesive;

shaping the resulting mixture, optionally on a carrier or substrate; and storing the shaped mixture under conditions under which the silane-functional apolar polymer crosslinks with water.

11. The method as claimed in claim 10, wherein the silane-functional apolar polymer is crosslinked with water in the form of atmospheric moisture.

12. An adhesive body composed of a composition comprising:

at least one structural adhesive, and at least one chemically crosslinked elastomer based on a silane-functional apolar polymer that is a reaction product of a silane and an apolar polymer, wherein the apolar polymer is a polyether in which a ratio of carbon atoms to oxygen atoms of monomers in the polyether is on average greater than 3:1, and the silane has epoxide groups and the apolar polymer has epoxide-reactive groups, or the silane has epoxide-reactive groups and the apolar polymer has epoxide groups.

13. The adhesive body as claimed in claim 12, wherein it has a thickness in a range of from 0.1 to 5 mm.

14. A method comprising joining two substrates with an adhesive body as claimed in claim 12.

15. The method as claimed in claim 14, comprising:

applying the adhesive body to a first substrate, contacting the adhesive body on the first substrate with a second substrate, and curing the adhesive body.

* * * * *